(12) United States Patent
Boerman

(10) Patent No.: US 11,029,137 B2
(45) Date of Patent: Jun. 8, 2021

(54) FIXTURE PIN ASSEMBLY SYSTEM

(71) Applicant: Scott Boerman, Lapeer, MI (US)

(72) Inventor: Scott Boerman, Lapeer, MI (US)

( * ) Notice: Subject to any disclaimer, the term of this patent is extended or adjusted under 35 U.S.C. 154(b) by 351 days.

(21) Appl. No.: 16/358,012

(22) Filed: Mar. 19, 2019

(65) Prior Publication Data

US 2019/0368852 A1 Dec. 5, 2019

Related U.S. Application Data

(60) Provisional application No. 62/678,007, filed on May 30, 2018.

(51) Int. Cl.
| | |
|---|---|
| *G05G 1/04* | (2006.01) |
| *G01B 5/00* | (2006.01) |
| *G05G 1/02* | (2006.01) |
| *G01B 5/12* | (2006.01) |
| *F16C 1/10* | (2006.01) |

(52) U.S. Cl.
CPC ............ *G01B 5/0004* (2013.01); *G01B 5/12* (2013.01); *G05G 1/025* (2013.01); *F16C 1/10* (2013.01)

(58) Field of Classification Search
CPC ...... G01B 5/0002; G01B 5/0004; G01B 5/08; G01B 5/12; G05G 1/02; G05G 1/025; G05G 1/04; G05G 5/05; F16C 1/10; F16C 1/12
See application file for complete search history.

(56) References Cited

U.S. PATENT DOCUMENTS

| | | | | |
|---|---|---|---|---|
| 3,472,096 A | * | 10/1969 | Gerhard ................. | B60T 7/102 74/501.6 |
| 3,635,096 A | * | 1/1972 | Caufield ................. | B64D 1/22 74/2 |
| 4,007,647 A | * | 2/1977 | Carlson .................. | F02M 1/02 74/502.4 |
| 4,037,488 A | * | 7/1977 | Laney, Sr. .............. | B23Q 5/54 74/548 |
| 4,332,423 A | * | 6/1982 | Schopper ............... | B60T 8/185 303/22.7 |
| 4,467,663 A | * | 8/1984 | van der Lely ......... | F16D 43/286 74/15.4 |
| RE31,899 E | * | 5/1985 | Mochida ................. | F16C 1/10 292/336.3 |

(Continued)

*Primary Examiner* — Richard W Ridley
*Assistant Examiner* — Brian J McGovern
(74) *Attorney, Agent, or Firm* — Chen-Chi Lin

(57) ABSTRACT

A fixture pin assembly for presenting a pin in a specified location and orientation to provide positioning or dimensional verification for a target part. The fixture pin assembly comprises a block, a pin, and an actuator set. The block includes a plurality of holes on a plurality of surfaces to attach directly or indirectly to mating bushings, pins, and actuation component sets. Pin and bushing act in combination to present a pin which is fixed or may allow motion in specified directions. Actuation component set provides motion control of the pin to either fix the location in longitudinal direction or allow longitudinal motion with or without springs to impart force either rearward or forward. A cable actuation system provides for remote release functionality of pin. Entire system design is configurable and interchangeable to provide cost-effective and space-effective implementation.

16 Claims, 9 Drawing Sheets

(56) References Cited

U.S. PATENT DOCUMENTS

| | | | | |
|---|---|---|---|---|
| 4,560,049 | A * | 12/1985 | Uchibaba | B62K 23/02 192/85.01 |
| 4,640,487 | A * | 2/1987 | Salter | F16L 3/2056 188/380 |
| 4,984,853 | A * | 1/1991 | Thioux | B60T 8/1806 188/195 |
| 5,735,056 | A * | 4/1998 | Gosine | B23Q 16/004 33/568 |
| 5,771,836 | A * | 6/1998 | Crouse | B63B 34/67 116/209 |
| 10,072,685 | B2 | 9/2018 | Boerman | |
| 10,131,028 | B1 * | 11/2018 | Allison | B24D 15/08 |
| 10,584,767 | B1 * | 3/2020 | Vincent | B60R 25/007 |
| 2003/0207741 | A1 * | 11/2003 | Yu | A63B 21/157 482/132 |
| 2009/0120751 | A1 * | 5/2009 | Lin | B60T 7/10 188/344 |
| 2012/0080890 | A1 * | 4/2012 | Loret de Mola | E05B 5/00 292/157 |
| 2013/0042944 | A1 * | 2/2013 | Campbell | B09B 3/0058 141/65 |
| 2013/0192941 | A1 * | 8/2013 | Lin | B60T 7/102 188/344 |
| 2013/0282143 | A1 * | 10/2013 | Perkins | A61F 2/80 623/36 |
| 2013/0333994 | A1 * | 12/2013 | Jordan | B62L 3/023 188/344 |
| 2016/0018841 | A1 * | 1/2016 | Young | B60S 9/04 280/763.1 |
| 2016/0131302 | A1 * | 5/2016 | Hirano | G01B 5/201 33/568 |
| 2016/0259300 | A1 * | 9/2016 | Bentrim | G04B 3/048 |
| 2016/0365203 | A1 * | 12/2016 | Hidai | G05G 1/02 |
| 2017/0204897 | A1 * | 7/2017 | DesJarlais | F16C 1/16 |
| 2018/0056950 | A1 * | 3/2018 | Steakley | B60T 13/746 |
| 2018/0162263 | A1 * | 6/2018 | Kim | B60Q 1/0076 |

* cited by examiner

Section A-A

Section B-B

FIXTURE PIN ASSEMBLY SYSTEM

CROSS-REFERENCE TO RELATED APPLICATIONS

This patent application claims benefit of a Provisional Patent Application 62/678,007 filed on May 30, 2018. The Disclosure made in the Provisional Patent Application 62/678,007 and the Disclosure made in U.S. Pat. No. 10,072,685 to Boerman are hereby incorporated by reference.

FIELD OF THE INVENTION

The present invention relates to a fixture pin assembly system. More particularly, the present invention relates to a fixture pin assembly system comprising interchangeable actuation sets.

BACKGROUND

Pin assemblies used for locating and dimensionally validating holes and other features of a target part are known in the art. Check Fixtures, also known as checking fixtures, inspection fixtures, dimensional fixtures, CMM holding fixtures and otherwise, often include pins assemblies which may employ design features that provide for translational or rotational movement of a pin for a particular application, or alternately the pins may be constrained in a fixed location. Pin assemblies may include tapered, cylindrical, oval, diamond, or otherwise shaped end configurations to provide various functions needed to dimensionally inspect or verify features of a target part. These functionalities are desirable to allow inspection of specific features of a target part in a manner that conforms to requirements for an individual target part or an assembly that may be specified via Geometric Dimensioning and Tolerancing (GDT) specifications or by other forms of communication.

Conventional pin and block assemblies are typically designed and constructed on an as-needed basis in low quantity for application in holding fixtures, check fixtures, and other fixtures, using design techniques commonly applied in traditional machining operations of blocks, plates, bars, and pins. In order to achieve the required goals, these conventional techniques incur excessive design and construction time and cost due to the individualized nature of the design and construction which require time-consuming creative design and time-consuming setup and adjustment during construction. Additionally, there are excessive costs associated with the conventional methods due to the application of conventional, costly machining operations to design and produce all of the components of the pin assembly system in very low quantity. Additionally, conventional methods often produce a design that is often larger than is convenient which results in costly design compromises in adjacent components of the entire surrounding fixture system design. Additionally, conventional methods do not provide for a remote activation system to allow activation from a location that is more convenient than activation from the immediate vicinity of the pin system.

Therefore, a need exists for a fixture pin assembly system which employs design features that provide for adaptation to many applications with interchangeable components. Also there exists a need for a fixture pin assembly system that employs manufacturing methods that allow interchangeable components made with low-cost processes, the low cost being further achieved through mass production techniques, and also include other features which address the previously listed inefficiencies of conventional methods.

SUMMARY OF THE INVENTION

A general objective of the present invention is to provide a method of presenting a pin which provides a function during the dimensional inspection of a target part. The function is most commonly to either locate said target part when a hole or opening in said part is disposed around the fixture pin, or by verifying the location of a hole, opening, or edge of said target part due to the designed pin size and shape being specifically employed to verify a proper dimensional condition that is required by GDT or by other methods of communication. Said target parts may be components or assemblies used in complex products such as automobiles, other transportation equipment, or other manufactured items.

The invention provides a pin assembly system which includes a variety of bodies, pins, adapters, retainers, springs, levers, fasteners and miscellaneous components which provide for several different methods of actuation by springs, levers, pushbuttons, cables or other means that may impart an extending or a retracing force upon a pin, or may provide for fixed location of a pin, depending on the need for a specific application. Also the invention includes a system of a cable and cable remote actuation components which work in a coordinated fashion with the aforementioned bodies, pins, bushings etc. to provide a desired function to remotely actuate pins.

The present invention also provides the functions listed and required including being dimensionally strong and stable enough for the necessary functions, in an overall size which can be incorporated into a fixture assembly design without undue encroachment on adjacent components of the fixture, which provides improved usability of invented pin assembly system.

DETAILED DESCRIPTION

The invention provides a fixture pin assembly for locating and/or verifying the position ("checking") holes or other features of a target part for purposes of dimensional or visual inspection, or for purposes of additional assembly or other secondary processes. The device employs a block and a pin and optionally some combination of top plate, side mounting plate or angle, and actuation assembly comprised of retainers, springs, levers, extenders, or other members which act together to provide for presenting the pin in either a fixed or moving function to perform the necessary function. The system of block, pin, actuation sets, top plates, side mounting plate or angle, clamp bracket, and other components are devised in such a way as to provide for extensive configurations and pin sizes to allow adaptation of the system to a wide variety of applications and functions.

In addition to the meaning recognized by a person having ordinary skill in the art, the term "attached" further defines the relationship between components which may be fixed location relative to each other; which may be a moving fit relative to each other with motion in one or more directions and insignificant motion in other directions; and which may be referred to as a slip fit.

Figure 1A:
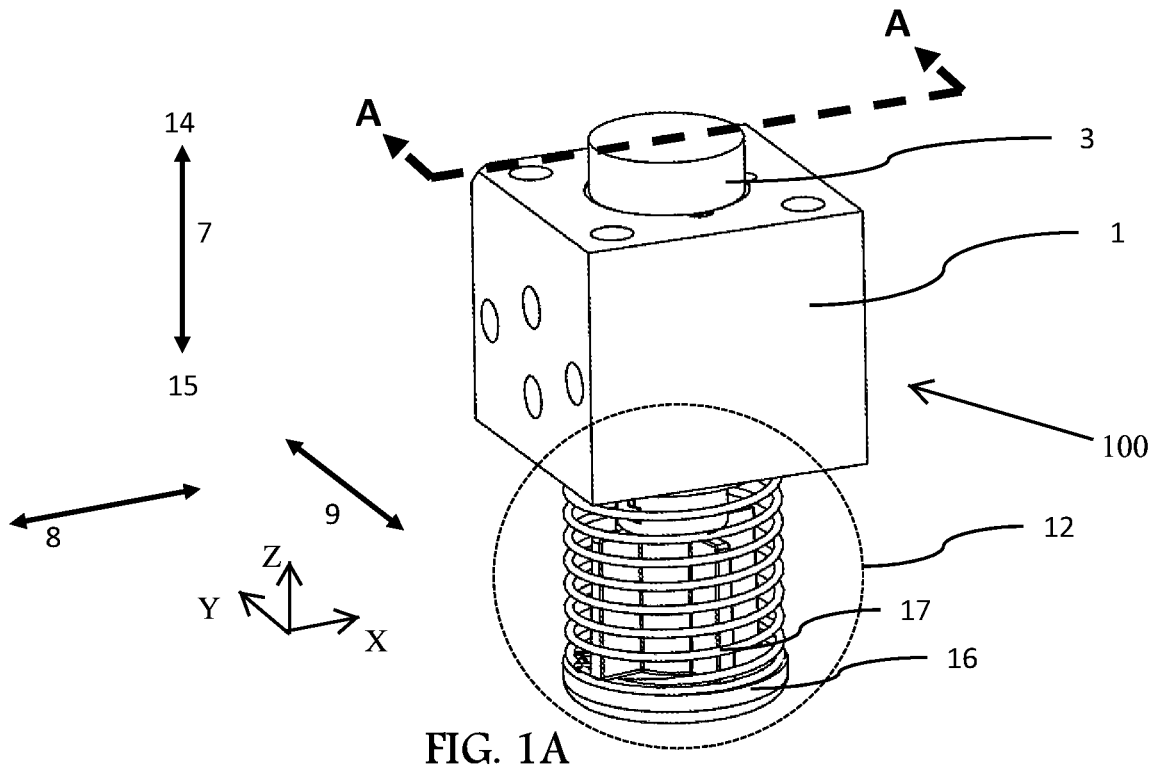
FIG. 1A is a perspective view and FIG. 1B is a cross-sectional view of a fixture pin assembly system in examples of the present disclosure.
Figure 1B:
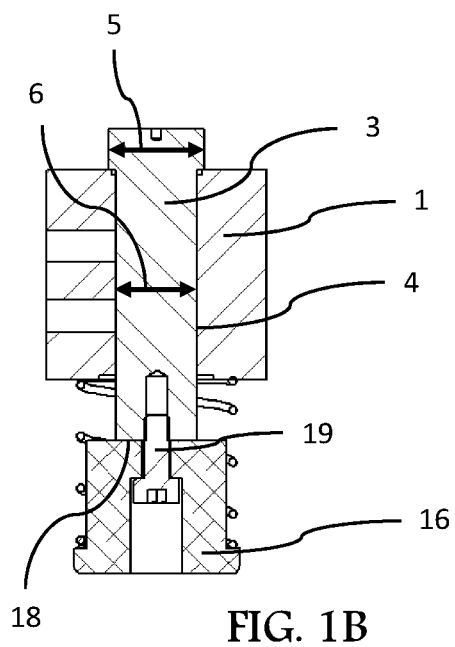

FIG. 1A is a perspective view and FIG. 1B is a cross-sectional view of a fixture pin assembly system 100 in examples of the present disclosure. The fixture pin assembly system 100 comprises a block 1, a pin 3, and an actuator set 12. The actuator set 12 comprises a spring 17, a pushbutton 16, and a fastener 19. The block 1 includes a pin hole 4. A portion of the pin 3 is moveable within the pin hole 4 of the block 1. Pin 3 has a shank portion 6 and a check portion 5. The shank portion 6 is a precision fit to the pin hole 4 of the block 1 so that dominating motion of the pin 3 is along the longitudinal direction 7 (Z-direction). The motion of the pin 3 along the transverse direction 8 (X-direction) and the perpendicular transverse direction 9 (Y-direction) is minimal. In one example, a ratio of the motion of the pin 3 in the Z-direction to the motion of the pin 3 in the Y-direction is in a range from 100 to 1,000. A ratio of the motion of the pin 3 in the Z-direction to the motion of the pin 3 in the X-direction is in a range from 100 to 1,000. Longitudinal direction 7, transverse direction 8, and perpendicular transverse direction 9 are all orthogonal to each other. In examples of the present disclosure, the spring 17 is a rearward acting spring which imparts a force in rearward direction 15 against the pushbutton 16. In examples of the present disclosure, a bottom surface 18 of the pin 3 contacts the pushbutton 16.

In examples of the present disclosure, the check portion 5 is of a cylindrical shape. The shank portion 6 is of a cylindrical shape. A diameter of the check portion 5 is larger than a diameter of the shank portion 6. In examples of the present disclosure, the check portion 5 and the shank portion 6 are formed from a single-piece construction. In one example, a machining process is applied to an aluminum block to form the check portion 5 and the shank portion 6 at a same time. In another example, the check portion 5 and the shank portion 6 are formed from a single metal casting process. In examples of the present disclosure, the check portion 5 and the shank portion 6 are formed from a two-piece construction. For example, the check portion 5 and the shank portion 6 are formed separately. Then, the check portion 5 is attached to the shank portion 6 by a fastener.

In examples of the present disclosure, a portion of the pin 3 moves within the pin hole 4 of the block 1 between a first end position and a second end position. In the first end position, a bottom surface of the check portion 5 contacts a top surface of the block 1. In the second end position, a top surface of the pushbutton 16 contacts a bottom surface of the block 1.

Figure 2:
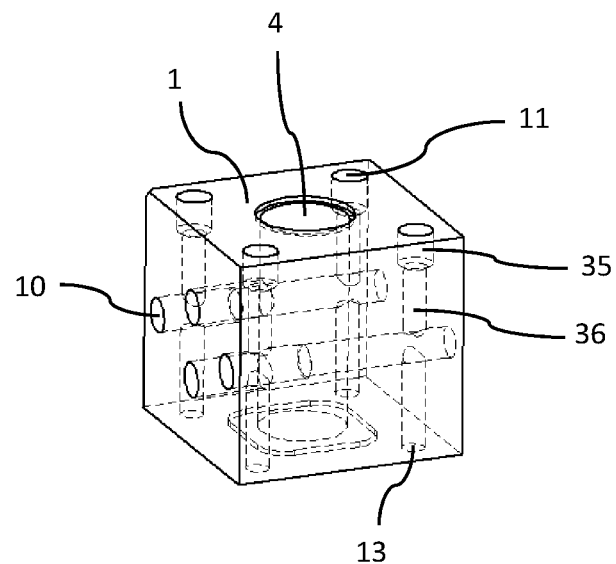
FIG. 2 is a perspective view of a block of the fixture pin assembly system in examples of the present disclosure. The block is shown in translucency for visualization purpose.

FIG. 2 is a perspective view of a block 1 of the fixture pin assembly system 100 in examples of the present disclosure. The block 1 is shown in translucency for visualization purpose. FIG. 2 depicts the presence of various holes in the block 1, including as the pin hole 4, side holes 10, segmented top holes 11, and bottom holes 13. Each of the segmented top holes 11 has a distinct upper segment 35 which is cylindrical in profile, and a lower segment 36 which is threaded.

Figure 3:
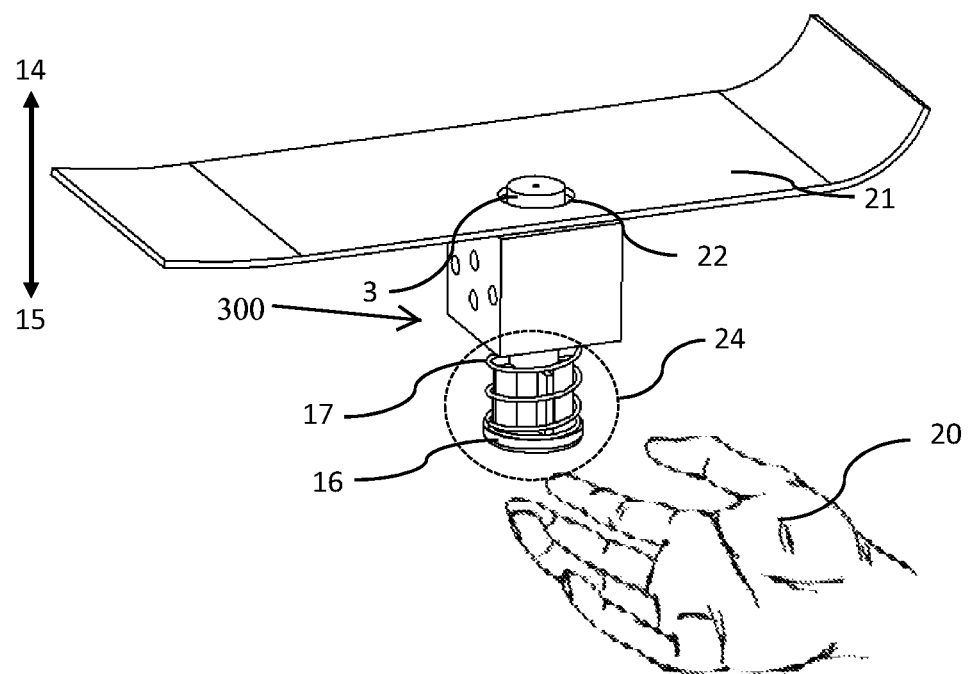
FIG. 3 is a perspective view of a fixture pin assembly system interacting with a target part in examples of the present disclosure.

FIG. 3 is a perspective view of a fixture pin assembly system 300 interacting with a target part 21 in examples of the present disclosure. The fixture pin assembly system 300 comprises an actuation set 24. A human hand 20 may apply a force to pushbutton 16 in a forward direction 14 which overpowers rearward acting spring 17 to impart motion of the pin 3. Pin 3 is shown in the extended position in a typical application so that the pin 3 engages a target part 21 to verify the position of a hole or opening 22 in target part 21. The fixture pin assembly system is mounted in a fixed position relative to the target part 21. For example, an inspection station may have a first set of locating pins or other components, defining certain holes or peripheral edge positions of a target part and a second set of pins to interact with other holes in the target part to perform intended dimensional verification functions.

Figure 4A:
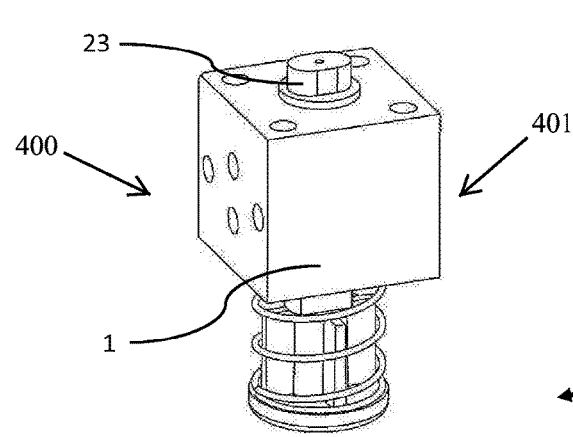
FIG. 4A is a perspective view and FIG. 4B is a partially exploded plot of a fixture pin assembly system in examples of the present disclosure.
Figure 4B:
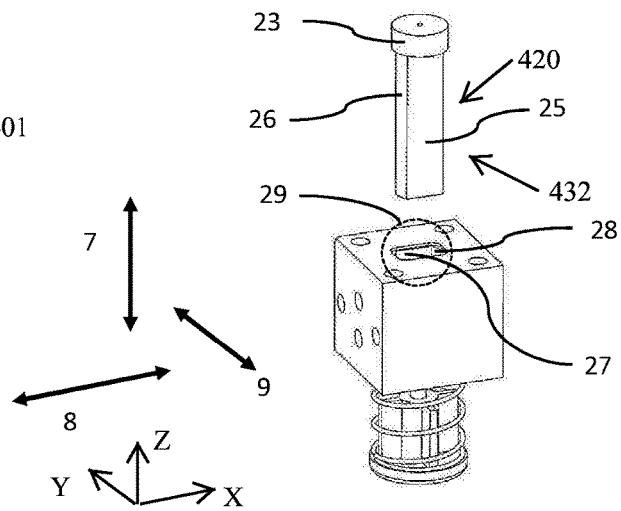

FIG. 4A is a perspective view and FIG. 4B is a partially exploded plot of a fixture pin assembly system 400 in examples of the present disclosure. Pin 23 includes a non-round portion 420. The non-round portion 420 has sides 25 and an end portion 26. The non-round portion 420 has dimensions to allow an intentional precision fit within the pin hole 29 of block 401. The relationship between the non-round portion 420 and the size of sides 27 of non-round hole in block 401 is typically a precision fit to allow sliding of the non-round portion 420 in the longitudinal direction 7 but little or no perceptible relative motion in the perpendicular transverse direction 9. The size relationship between the end portions 28 of the pin hole 29 in block 401 may be of a precision fit to allow little or no perceptible motion in the transverse direction 8. Alternatively, the size relationship may provide for free motion in the transverse direction 8 so that the size relationship is applied with specific intent to achieve the desired function when engaged with target part 21.

In examples of the present disclosure, a cross section of the pin hole 29 of the block 401 is of a non-circular shape. A cross section of shank portion of the pin 432 is of a non-circular shape. A ratio of an area of the cross section of shank portion of the pin 432 to an area of the cross section of the pin hole 29 of the block 401 is in a range from 90% to 99.99% so as to form an areal precision fit. Therefore, a ratio of a first motion of the pin 432 in a first direction (Z-direction) to a second motion of the pin 432 in a second direction (X-direction) is in a range from 100 to 1,000. A ratio of the first motion of the pin 432 in the first direction (Z-direction) to a third motion of the pin 432 in a third direction (Y-direction) is in a range from 100 to 1,000.

In examples of the present disclosure, a cross section of the pin hole 29 of the block 401 is of a non-circular shape. A cross section of shank portion of the pin 432 is of a non-circular shape. A ratio of a length of the cross section of shank portion of the pin 432 to a length of the cross section of the pin hole 29 of the block 401 is in a range from 90% to 99.99%. A ratio of a width of the cross section of shank portion of the pin 432 to a width of the cross section of the pin hole 29 of the block 401 is in a range from 30% to 89.99% so as to form a lengthwise precision fit. Therefore, a ratio of a first motion of the pin 432 in a first direction (Z-direction) to a second motion of the pin 432 in a second direction (Y-direction) is in a range from 100 to 1,000. A ratio of the first motion of the pin 432 in the first direction (Z-direction) to a third motion of the pin 432 in a third direction (X-direction) is in a range from 2 to 50.

Figure 5A:
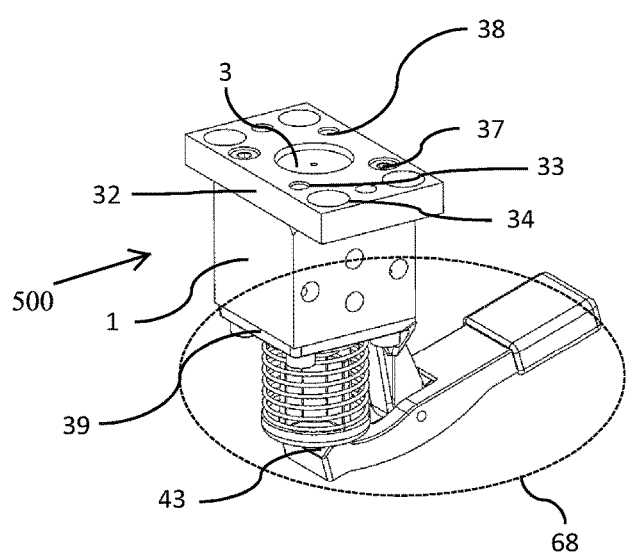
FIG. 5A is a perspective view and FIG. 5B is another perspective view of a fixture pin assembly system in examples of the present disclosure.
Figure 5B:
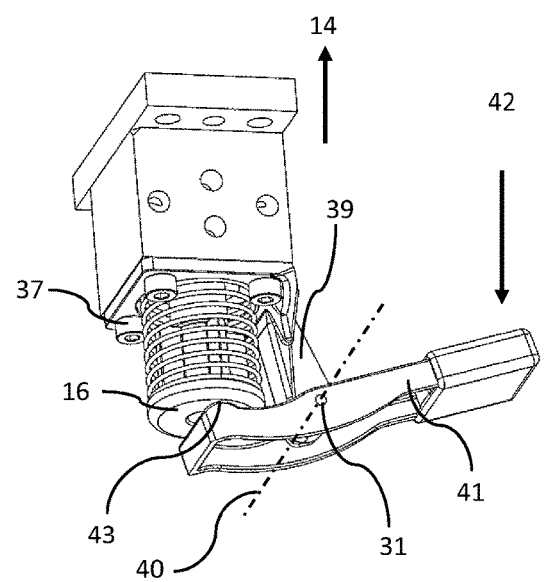
Figure 5C:
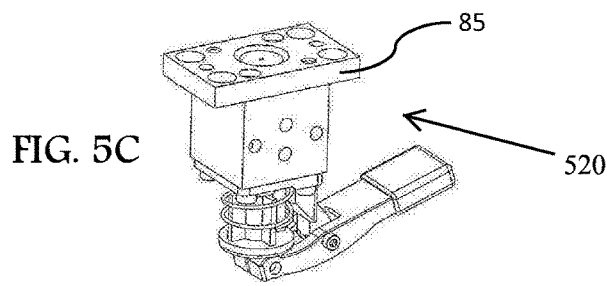
FIG. 5C shows the fixture pin assembly system of FIG. 5A with a top plate aligned in an alternate direction.

FIG. 5A is a perspective view, from the top, and FIG. 5B is another perspective view, from the bottom, of a fixture pin assembly system 500 in examples of the present disclosure. In FIG. 5A, fixture pin assembly system 500 includes a top mounting plate 32 which is attached to block 1 via fasteners 37 and 38 to provide for effective precise and convenient attachment of the fixture pin assembly system 500 within a larger fixture system. Top mounting plate 32 may include holes 33 that are used with fasteners 37 and 38 in an arrangement wherein said fasteners can be inserted into block top holes 11 (FIG. 2), with either a cylindrical pin or a common threaded fastener. One notable function of the segmented top holes is to provide for ambidextrous use in a larger fixture assembly, wherein a top mounting plate 32 can have an asymmetrical hole pattern, but can be employed in typical handed applications (for example, lh/rh of a vehicle) with mirrored geometry because segmented top holes 11 provide for attachment to either fastener 38 (for example, a dowel pin) or a fastener 37 (for example, a screw). In examples of the present disclosure, top mounting plate 32 may also be installed in rotated orientations (for example, see the orientation of the top mounting plate 85 of FIG. 5C) by using four screw hole locations at four vertices of a square respectively. This function is enabled by the segmented nature of segmented top holes 11. Top mounting plate 32 may also include holes 34 which allow convenient and efficient mounting of the invention into larger fixture assembly. FIG. 5B illustrates a lever base 39 which is fixed to block 1 via fasteners 37 (for example, screws). Lever base 39 includes a pivot hole surrounding axis 40. Lever 41 includes a pivot hole 31 which surrounds axis 40. The pivot hole in lever base 39 and the pivot hole 31 in lever 41 are arranged coaxially and are engaged with a common pin or screw to allow the lever 41 to rotate relative to lever base 39. Upon application of force, typically by a human hand, in direction and location 42, lever anvil 43 imparts a force to pushbutton 16 to overcome rearward acting spring 17 to produce motion of pin 3 in forward direction 14.

Figure 6A:
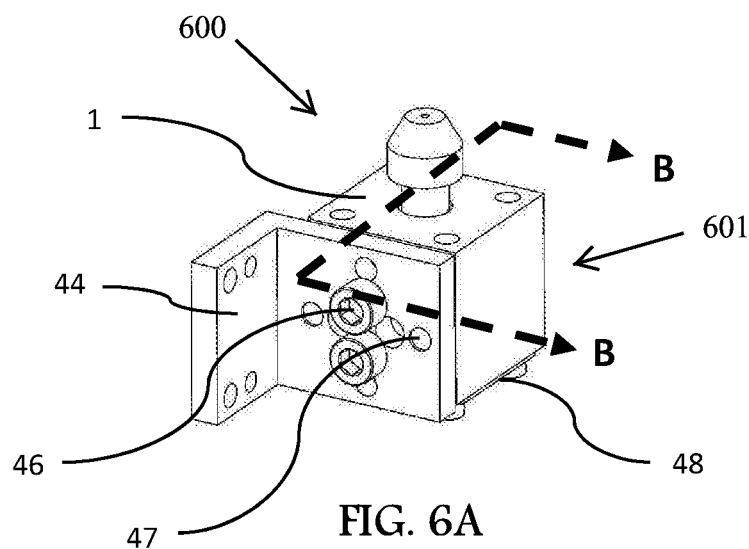
FIG. 6A is a perspective view and FIG. 6B is a cross-sectional view of a fixture pin assembly system with a side-mounting angle element in examples of the present disclosure.
Figure 6B:
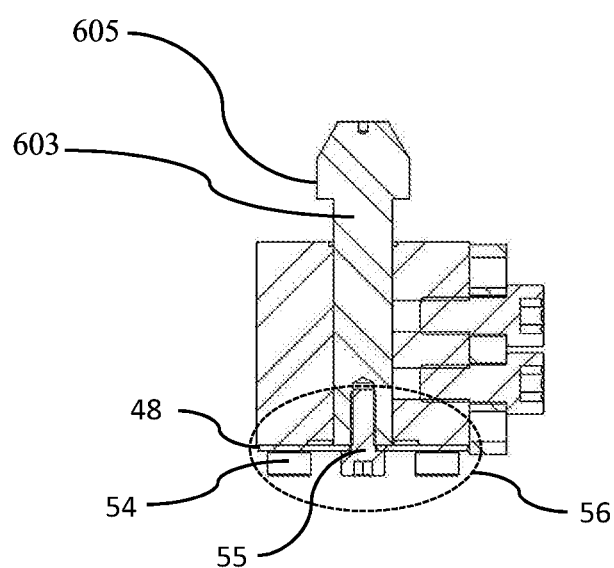

FIG. 6A is a perspective view and FIG. 6B is a cross-sectional view of a fixture pin assembly system 600 with a side-mounting angle element 44 in examples of the present disclosure. A side-mount angle element 44 is attached to side holes 10 of FIG. 2 of block 601 via screws 46 and dowel pins 47. A fixing plate 48 is rigidly attached to bottom holes 13 of FIG. 2 of block 601 via screws 54. Fixing plate 48 is also rigidly attached to pin 603 via screw 55. This arrangement with a fixing plate version of actuation component set 56 results in the check portion 605 of pin 603 being in a fixed position in the larger fixture assembly to perform a desired dimensional function relative to target part 21.

Figure 7:
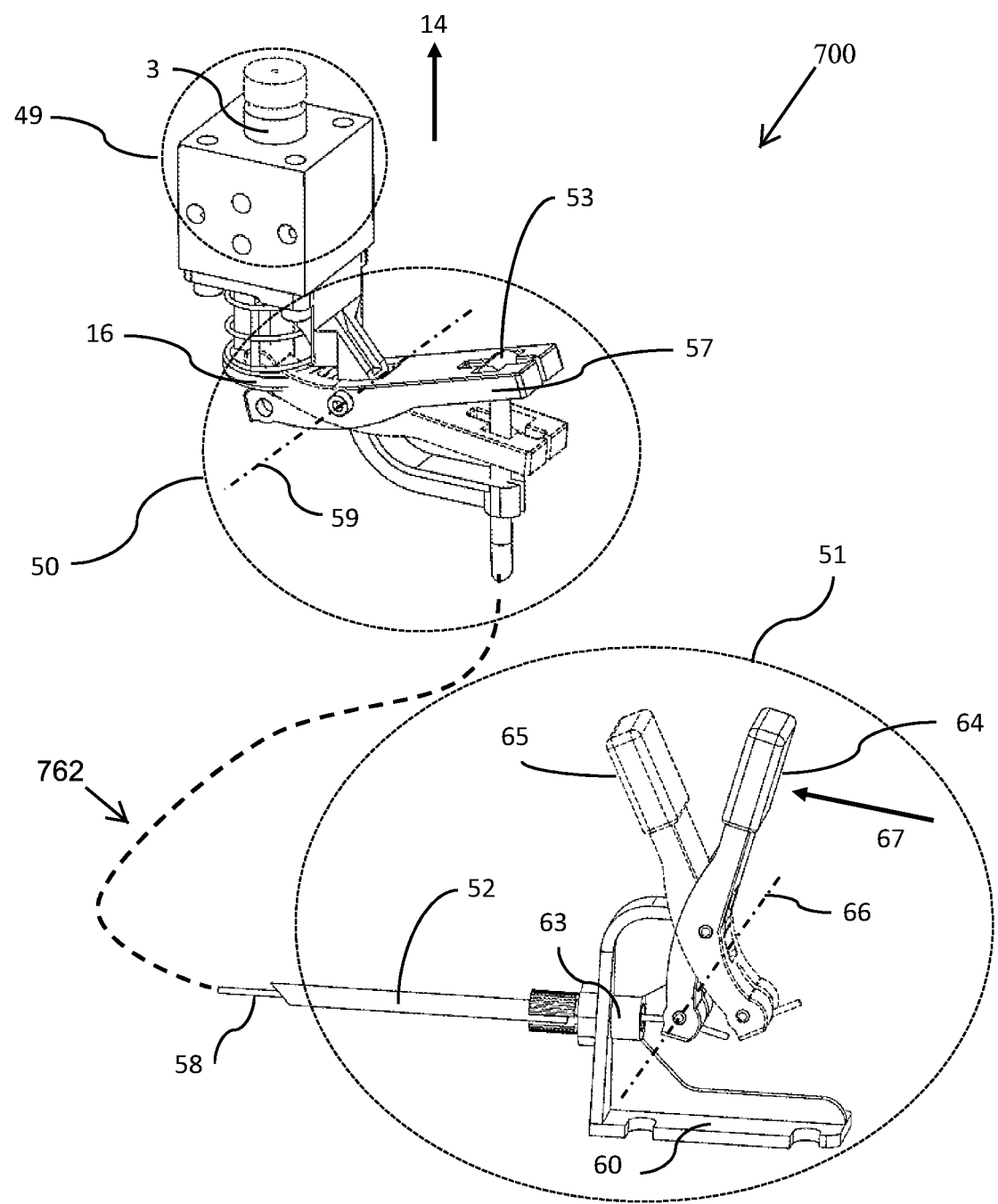
FIG. 7 is a perspective view a fixture pin assembly system with a remote cable actuation system in examples of the present disclosure.

FIG. 7 is a perspective view a fixture pin assembly system 700 with a remote cable actuation system 51 in examples of the present disclosure. The remote cable actuation system 51 comprises a cable base 60. The remote cable actuation system 51 actuates a pin 3. The fixture pin assembly system 700 comprises a primary pin assembly 49 and a cable driven subassembly 50. A cable 762 is shown in dashed lines. During use, a human operator applies an impulse force in direction 67 to lever 64 (rotatable about an axis 66) which imparts a rotation of said lever toward lever extended position 65 (shown in dashed lines) which in result pulls on cable inner portion 58, which in turns moves cable driven lever 57, which in turn impacts rotation of lever 57 about axis 59, which imparts an upward force upon the pushbutton 16, which in turn imparts upward motion to the pin 3 in forward direction 14. The result of the activity of the cable driven subassembly 50 and remote cable actuation system 51, when given impulse by a human operator, is to allow a remote actuation of the pin 3 in situations where direct immediate access to the primary pin assembly 49 is prevented or made impractical by other unrelated portions of the larger fixture assembly. In one example, a length of the cable 762 is in a range from 0.25 meter to 2 meters. In another example, a length of the cable 762 is in a range from 2 meters to 5 meters. In examples of the present disclosure, the cable 762 includes a barrel end 53.

Figure 8A:
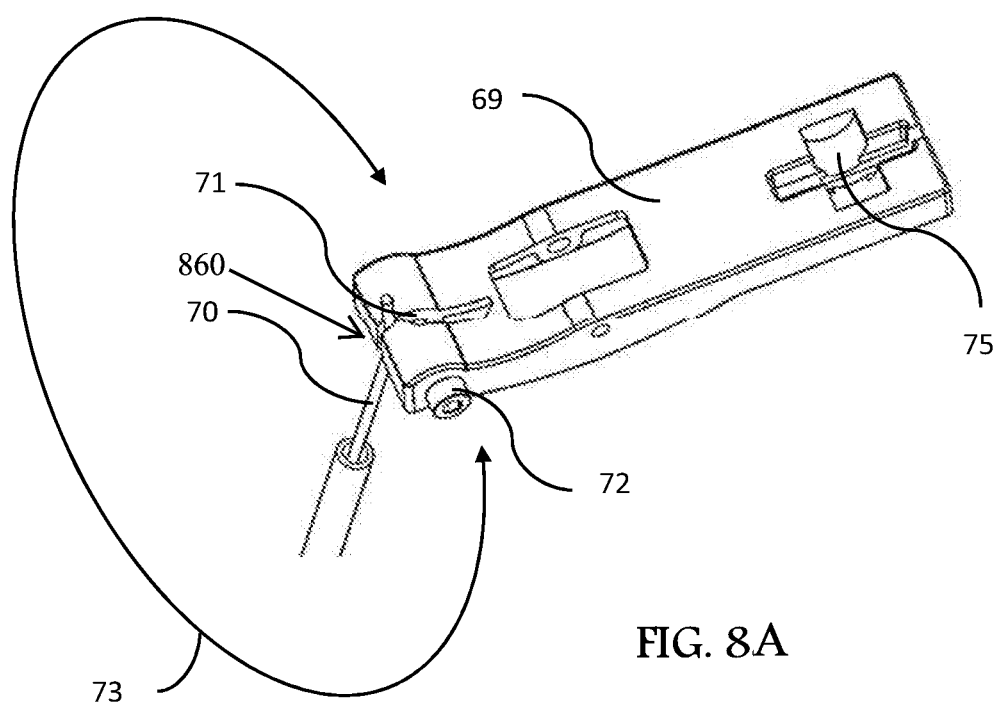
FIG. 8A is a perspective view of a lever and FIG. 8B is perspective view of another lever in examples of the present disclosure.
Figure 8B:
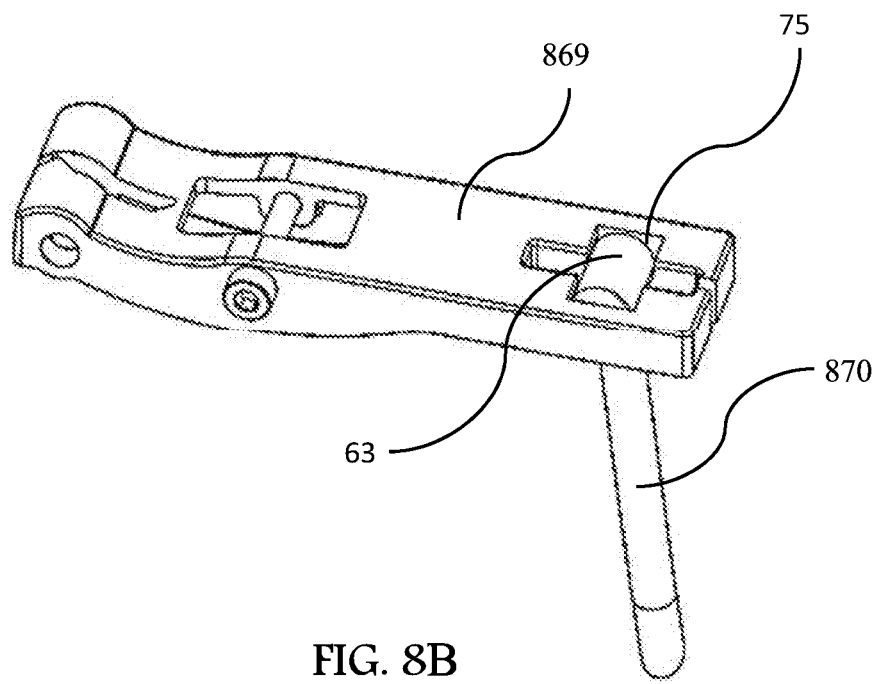

FIG. 8A is a perspective view of a lever 69 and FIG. 8B is perspective view of another lever 869 in examples of the present disclosure. FIG. 8A depicts a lever 69 of a remote cable actuation assembly with linear portion of an inner portion of a cable 70 being pinched within the lever 69 in the pinch area 71. The pinch area 71 comprises a slot 860 which allows non-destructive deformation of the lever 69 to pinch the cable 70 and to hold the cable 70 rigidly relative to the lever 69. Pinching screw 72 is one possible non-limiting component with which pinching force 73 can be applied.

FIG. 8B shows cable barrel end 63 of cable 870 attached to socket area 75 of lever 869.

Figure 9:
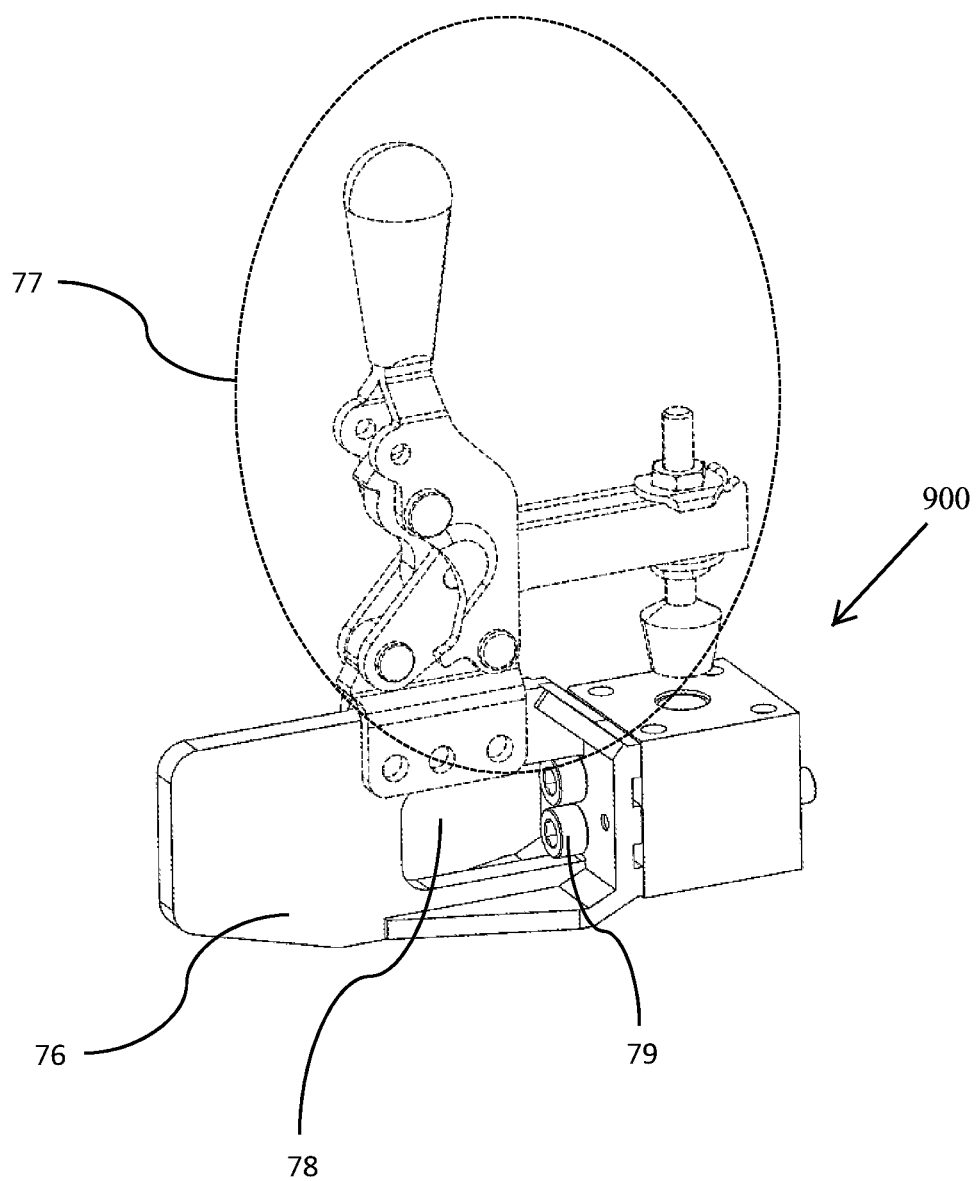
FIG. 9 is a perspective view a block with a clamp assembly in examples of the present disclosure.

FIG. 9 is a perspective view a block 900 with a clamp assembly in examples of the present disclosure. An optional clamp bracket 76 is attached to block 900 for the purpose of allowing practical attachment of a commercially available clamp assembly 77 to the block 900. The clamp bracket 76 is attached to the block 900 with screw fasteners 79. The screw fasteners 79 are disposed essentially in the same plane as the center plane of clamp bracket 76. The clamp bracket 76 includes an opening 78 which provides space to accommodate the screw fasteners 79 and also provides access for tools to install screw fasteners 79.

Figure 10A:
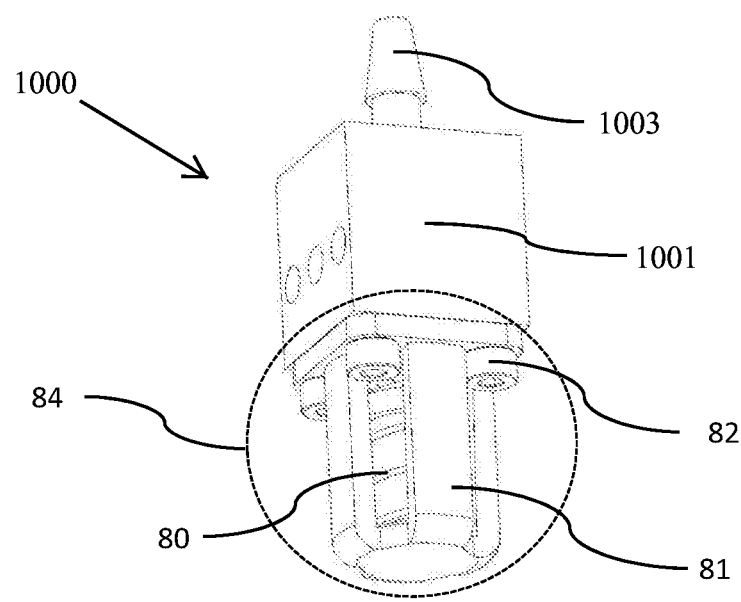
FIG. 10A is a perspective view and FIG. 10B is another perspective view of a fixture pin assembly system in examples of the present disclosure.
Figure 10B:
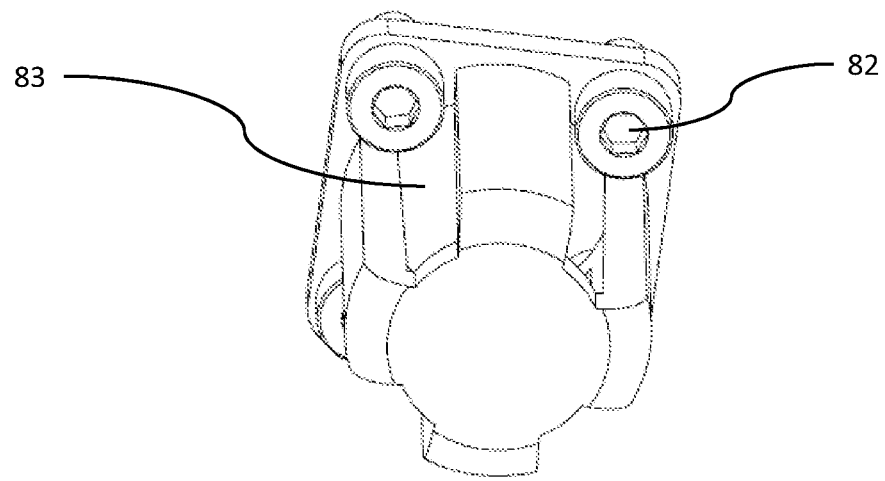

FIG. 10A is a perspective view and FIG. 10B is another perspective view of a fixture pin assembly system 1000 in examples of the present disclosure. The fixture pin assembly system 1000 includes an actuation set 84. The actuation set 84 includes a forward acting spring 80 which imparts a forward force to pin 1003. A spring retainer 81 is attached to block 1001 with one or more screw fasteners 82.

FIG. 10B shows an opening 83 in the spring retainer 81. The one or more screw fasteners are positioned at least partially in the opening 83. This arrangement achieves compactness and allows adequate space for the forward acting spring 80 to apply the degree of force and range of motion necessary for desired functionality.

Figure 11:
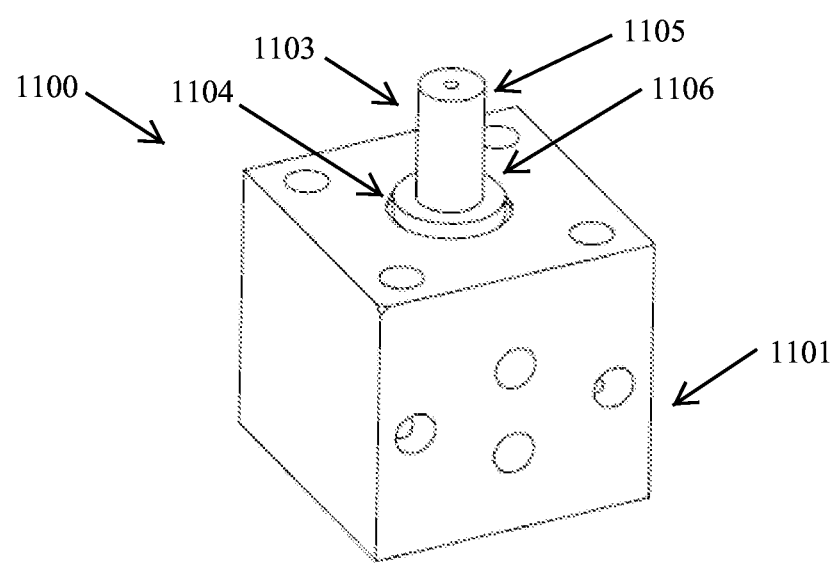
FIG. 11 is a perspective view of a fixture pin assembly system in examples of the present disclosure.

FIG. 11 is a perspective view of a fixture pin assembly system 1100 in examples of the present disclosure. The fixture pin assembly system 1100 comprises a block 1101 and a pin 1103. The block 1101 includes a pin hole 1104. A portion of the pin 1103 is moveable within the pin hole 1104 of the block 1101. Pin 1103 has a shank portion 1106 and a check portion 1105. In examples of the present disclosure, the check portion 1105 is of a cylindrical shape. The shank portion 1106 is of a cylindrical shape. A diameter of the check portion 1105 is smaller than a diameter of the shank portion 1106.

Throughout the figures, various configurations and embodiments of sets of actuation components are shown which demonstrates to only a limited degree the configurable and adaptable nature of the invention.

Those of ordinary skill in the art may recognize that modifications of the embodiments disclosed herein are possible. For example, a length of the cable 762 may vary. Other modifications may occur to those of ordinary skill in this art, and all such modifications are deemed to fall within the purview of the present invention, as defined by the claims.

The invention claimed is:

1. A pin assembly system comprising:
    a block comprising a pin hole;
    a pin comprising:
        a check portion;
        a shank portion;
    wherein a portion of the shank portion of the pin is within the pin hole of the block;
    a mounting plate directly attached to a bottom exterior surface of the block through a plurality of fasteners, the plurality of fasteners are engaged in a plurality of holes in the bottom exterior surface of the block;
    a lever pivotally attached to the mounting plate, the lever configured to contact a first end of the pin upon pivoting of the lever;
    a spring disposed between the bottom exterior surface of the block and the first end of the pin such that a second end of the pin is biased to rest against a top exterior surface of the block.

2. The pin assembly system of claim 1, further comprising: a top mounting plate attached to the top exterior surface of the block through a plurality of fasteners, the plurality of fasteners are engaged in a plurality of holes in the top exterior surface of the block.

3. The pin assembly system of claim 1, wherein the check portion of the pin is of a cylindrical shape;
    wherein the shank portion of the pin is of a cylindrical shape; and
    wherein a diameter of the check portion is larger than a diameter of the shank portion.

4. The pin assembly system of claim 3, wherein the first end of the pin comprises a pushbutton attached to the shank portion with a fastener.

5. A pin assembly system comprising:
    a block comprising a pin hole;
    a pin comprising:
        a check portion; and
        a shank portion; and
    an actuation set attached to the pin;
    wherein a portion of the shank portion of the pin is within the pin hole of the block;
    wherein a cross section of the pin hole of the block is of a non-circular shape;
    wherein a cross section of the shank portion of the pin is of a non-circular shape;
    wherein a ratio of an area of the cross section of the shank portion of the pin to an area of the cross section of the pin hole of the block is in a range from 90% to 99.99% so as to form an areal precision fit so that:
        a ratio of a first motion of the pin in a first direction to a second motion of the pin in a second direction perpendicular to the first direction is in a range from 100 to 1000; and
        a ratio of the first motion of the pin in the first direction to a third motion of the pin in a third direction perpendicular to the first direction and the second direction is in a range from 100 to 1000.

6. A pin assembly system comprising:
    a block comprising a pin hole;
    a pin comprising:
        a check portion; and
        a shank portion; and
    an actuation set attached to the pin;
    wherein a portion of the shank portion of the pin is within the pin hole of the block;
    wherein a cross section of the pin hole of the block is of a non-circular shape;
    wherein a cross section of the shank portion of the pin is of a non-circular shape;
    wherein a ratio of a length of the cross section of the shank portion of the pin to a length of the cross section of the pin hole of the block is in a range from 90% to 99.99%; and
    a ratio of a width of the cross section of the shank portion of the pin to a width of the cross section of the pin hole of the block is in a range from 30% to 89.99% so as to form a lengthwise precision fit so that:
        a ratio of a first motion of the pin in a first direction to a second motion of the pin in a second direction perpendicular to the first direction is in a range from 100 to 1000; and
        a ratio of the first motion of the pin in the first direction to a third motion of the pin in a third direction perpendicular to the first direction and the second direction is in a range from 2 to 50.

7. The pin assembly system of claim 1, further comprising:
    wherein the first end of the pin includes a pushbutton;
    the pin comprises a first end position in which the second end of the pin rests against the top exterior surface of the block and a second end position in which a top surface of the pushbutton contacts the bottom exterior surface of the block, the pin being movable between the first end position and the second end position.

8. The pin assembly system of claim 7, wherein the lever is rotatable about a lever axis;
    wherein the lever comprises a first end and a second end opposite the first end;
    wherein the first end of the lever is connected to a remote cable actuation system through a cable; and
    wherein the second end of the lever is configured to press the pushbutton.

9. The pin assembly system of claim 8, wherein the cable comprises a barrel end;
    wherein the barrel end of the cable is directly connected to the first end of the lever.

10. The pin assembly system of claim 9, wherein the first end of the lever comprises a socket to accommodate the barrel end of the cable.

11. The pin assembly system of claim 8, wherein a linear portion of the cable is directly connected to a pinch portion of the lever.

12. The pin assembly system of claim 1 further comprising a top mounting plate directly attached to the top exterior surface of the block;

wherein a longitudinal direction of the top mounting plate is aligned along a first direction or is aligned along a second direction perpendicular to the first direction using a same set of holes on the top surface of the block.

13. The pin assembly system of claim 1, wherein the block is of a rectangular prism shape;
wherein a side-mounting angle element is directly attached to a side surface of the block; and
wherein a first member of the side-mounting angle element is perpendicular to a second member of the side-mounting angle element.

14. The pin assembly system of claim 1, wherein the lever is a hand-operated lever configured to be pressed by a user to operate the pin.

15. The pin assembly system of claim 1, wherein the block is of a rectangular prism shape;
wherein a clamp bracket is directly attached to a side surface of the block;
wherein the clamp bracket comprises an opening for fastener attachment.

16. The pin assembly system of claim 1, wherein the mounting plate includes a central cavity and the spring extends through the central cavity.

* * * * *